United States Patent
D'Elena et al.

(10) Patent No.: US 10,623,184 B2
(45) Date of Patent: Apr. 14, 2020

(54) SMART RESOURCE ACCESS FOR DECRYPTED INFORMATION

(71) Applicant: International Business Machines Corporation, Armonk, NY (US)

(72) Inventors: Daniel F. D'Elena, West Milford, NJ (US); Anthony E. Martinez, Orcas, WA (US); Vanessa V. Michelini, Boca Raton, FL (US); Vishwa Persaud, Woodbridge, NJ (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 14/868,801

(22) Filed: Sep. 29, 2015

(65) Prior Publication Data

US 2017/0093574 A1 Mar. 30, 2017

(51) Int. Cl.
*H04L 9/08* (2006.01)
*G06F 21/60* (2013.01)
*G06F 21/31* (2013.01)
*G06F 21/62* (2013.01)

(52) U.S. Cl.
CPC ............ *H04L 9/088* (2013.01); *G06F 21/316* (2013.01); *G06F 21/602* (2013.01); *G06F 21/6209* (2013.01); *H04L 9/0891* (2013.01); *G06F 2221/2133* (2013.01)

(58) Field of Classification Search
CPC ......... H04L 9/32; H04L 9/088; H04L 9/0891; G06F 21/00; G06F 21/602; G06F 21/316; G06F 21/6209; G06F 2221/2133
See application file for complete search history.

(56) References Cited

U.S. PATENT DOCUMENTS

| 5,109,413 | A | 4/1992 | Comerford et al. |
| 6,351,813 | B1 | 2/2002 | Mooney et al. |
| 7,392,547 | B2 | 6/2008 | Cahill et al. |
| 7,418,737 | B2 * | 8/2008 | Grupe ................ H04L 63/0428 705/51 |

(Continued)

FOREIGN PATENT DOCUMENTS

| GB | 2386710 A | 9/2003 |
| JP | 2010244432 A | 10/2010 |

OTHER PUBLICATIONS

IBM; "Time restrictions on files."; IP.com Prior Art Database Technical Disclosure; IP.com No. 000016246; Electronic Publication: Jun. 21, 2003; Original Publication Date: Oct. 5, 2002; pp. 1-3.

(Continued)

*Primary Examiner* — Cheng-Feng Huang
(74) *Attorney, Agent, or Firm* — Stephen R. Yoder; Gilbert Harmon, Jr.

(57) ABSTRACT

In an approach for protecting a resource, a processor receives a resource and a parameter, wherein the parameter indicates a condition upon which the resource will be made accessible. A processor encrypts the resource. A processor associates the parameter with decryption information for the encrypted resource. A processor sends the encrypted resource to a computing device. A processor determines that the condition of the parameter has been met based on external information regarding the parameter. A processor sends the decryption information to the computing device.

15 Claims, 3 Drawing Sheets

(56) References Cited

U.S. PATENT DOCUMENTS

| | | | |
|---|---|---|---|
| 8,458,454 B2 | 6/2013 | Murayama et al. | |
| 2002/0048369 A1* | 4/2002 | Ginter | G06F 21/10 |
| | | | 380/277 |
| 2002/0111946 A1* | 8/2002 | Fallon | G06Q 10/10 |
| 2003/0061511 A1* | 3/2003 | Fischer | H04L 63/02 |
| | | | 726/4 |
| 2004/0123104 A1* | 6/2004 | Boyen | G06F 21/602 |
| | | | 713/165 |
| 2007/0030964 A1* | 2/2007 | Soda | H04L 9/065 |
| | | | 380/44 |
| 2007/0192114 A1* | 8/2007 | Parpala | G06Q 50/186 |
| | | | 705/312 |
| 2008/0005024 A1 | 1/2008 | Kirkwood | |
| 2008/0141040 A1* | 6/2008 | Biddle | G06F 11/1415 |
| | | | 713/193 |
| 2009/0025063 A1 | 1/2009 | Thomas | |
| 2009/0141902 A1* | 6/2009 | Thywissen | H04L 9/0891 |
| | | | 380/279 |
| 2010/0138656 A1 | 6/2010 | Chinen et al. | |
| 2012/0210126 A1 | 8/2012 | Johnson et al. | |
| 2013/0064365 A1* | 3/2013 | Song | H04L 9/088 |
| | | | 380/44 |
| 2013/0332991 A1 | 12/2013 | Rivera | |
| 2014/0233740 A1* | 8/2014 | Niamut | H04L 9/3013 |
| | | | 380/279 |
| 2014/0281545 A1* | 9/2014 | Erofeev | G06F 21/6218 |
| | | | 713/171 |
| 2014/0344941 A1* | 11/2014 | Sibert | G06F 21/74 |
| | | | 726/26 |
| 2014/0359291 A1 | 12/2014 | Wilson et al. | |
| 2015/0180659 A1* | 6/2015 | Youn | H04L 9/0861 |
| | | | 380/44 |
| 2017/0098090 A1* | 4/2017 | Ali | G06F 17/21 |
| 2018/0007059 A1 | 1/2018 | Innes et al. | |

OTHER PUBLICATIONS

"A Lightweight and Safe File Protection System"; IP.com Prior Art Database Technical Disclosure; IP.com No. 000236659; Electronic Publication: May 8, 2014; pp. 1-4.

"FileOpen Document Protection Software Try it Free for 14 Days."; FileOpen Systems; Printed on: Jun. 22, 2015; pp. 1-2; <http://www.fileopen.com/document-protection-trial>.

"Pinion Software Announces New ShareSafe(TM) File Security Solutions"; Business Wire; May 1, 2007; Printed on: Jun. 22, 2015; pp. 1-2; <http://www.businesswire.com/news/home/20070501005717/en/Pinion-Software-Announces-ShareSafe-TM-File-Security#.VYg7rUZyKSd>.

* cited by examiner

SMART RESOURCE ACCESS FOR DECRYPTED INFORMATION

BACKGROUND

The present invention relates generally to the field of restricting access to a resource, and more particularly to encrypting the resource until an event transpires and then permitting access to the resource.

The use of data cryptography or data encryption is the process of encoding messages or information in such a way that only authorized parties can read the messages or information. Encryption does not of itself prevent interception, but denies the message content to the interceptor. In an encryption scheme, the message or information, referred to as plaintext, is encrypted using an encryption algorithm, generating cipher text that can only be read if decrypted. An authorized recipient can easily decrypt the message with the key provided by the originator to recipients, but not to unauthorized interceptors.

SUMMARY

A first aspect of the present invention provides a method for protecting a resource. In one embodiment, a processor receives a resource and a parameter, wherein the parameter indicates a condition upon which the resource will be made accessible. In one embodiment, a processor encrypts the resource. In one embodiment, a processor associates the parameter with decryption information for the encrypted resource. In one embodiment, a processor sends the encrypted resource to a computing device. In one embodiment, a processor determines that the condition of the parameter has been met based on external information regarding the parameter. In one embodiment, a processor sends the decryption information to the computing device.

A second aspect of the present invention provides a computer program product for protecting a resource. In one embodiment, a processor receives a resource and a parameter, wherein the parameter indicates a condition upon which the resource will be made accessible. In one embodiment, a processor encrypts the resource. In one embodiment, a processor associates the parameter with decryption information for the encrypted resource. In one embodiment, a processor sends the encrypted resource to a computing device. In one embodiment, a processor determines that the condition of the parameter has been met based on external information regarding the parameter. In one embodiment, a processor sends the decryption information to the computing device.

A third aspect of the present invention provides a computer system for protecting a resource. In one embodiment, a processor receives a resource and a parameter, wherein the parameter indicates a condition upon which the resource will be made accessible. In one embodiment, a processor encrypts the resource. In one embodiment, a processor associates the parameter with decryption information for the encrypted resource. In one embodiment, a processor sends the encrypted resource to a computing device. In one embodiment, a processor determines that the condition of the parameter has been met based on external information regarding the parameter. In one embodiment, a processor sends the decryption information to the computing device.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects may generally be referred to herein as a "circuit," "module", or "system." Furthermore, aspects of the present invention may take the form of a computer program product embodied in one or more computer readable medium(s) having computer readable program code/instructions embodied thereon.

Embodiments of the present invention disclose an approach to deny access to a resource until a predetermined time frame or triggering event occurs, then to permit access to the resource. Embodiments of the present invention encrypt the resource and then decrypt the resource once a specific triggering event occurs.

The present invention will now be described in detail with reference to the Figures.

Figure 1:
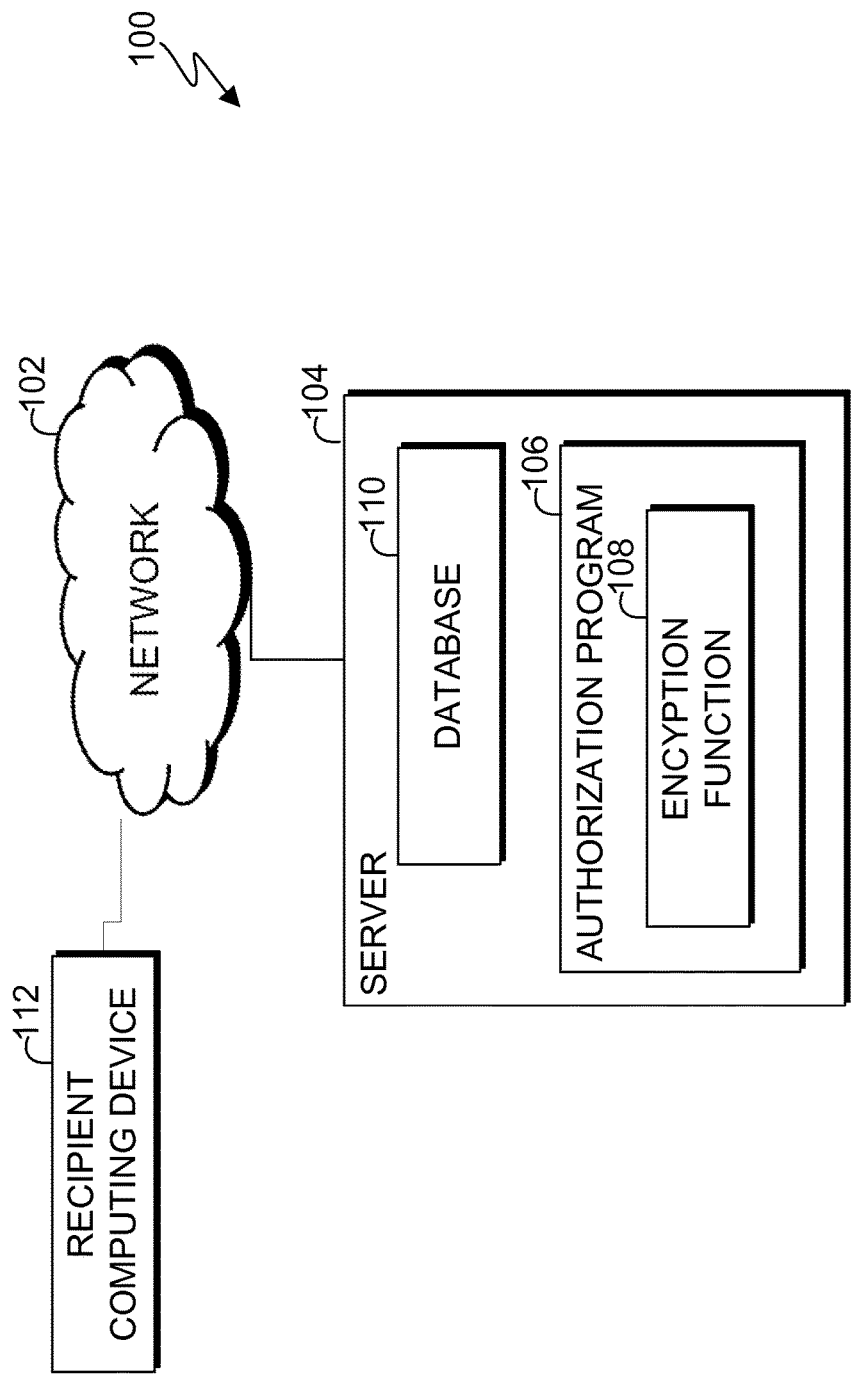
FIG. 1 illustrates a block diagram depicting a computing environment, according to an embodiment of the present invention.

FIG. 1 illustrates a block diagram of computing environment 100 in accordance with one embodiment of the present invention. FIG. 1 provides an illustration of one embodiment and does not imply any limitations regarding computing environment 100 in which different embodiments may be implemented. In the depicted embodiment, computing environment 100 includes, but is not limited to network 102, server 104, and computing device 112. Computing environment 100 may include additional computing devices, servers, computers, components, or additional devices not shown. It should be appreciated FIG. 1 provides only an illustration of one implementation and does not imply any limitations with regard to the environments in which different embodiments may be implemented. Many modifications to the depicted environment may be made.

Network 102 may be a local area network (LAN), a wide area network (WAN) such as the Internet, the public switched telephone network (PSTN), any combination thereof, or any combination of connections and protocols support communications between server 104 and vehicle computing device 108, in accordance with embodiments of the invention. Network 102 may include wired, wireless, or fiber optic connections.

Server 104 may be a management server, a web server, or additional electronic device or computing system capable of processing program instructions and receiving and sending data. In additional embodiments, server 104 may be a laptop computer, tablet computer, netbook computer, personal computer (PC), desktop computer, or any programmable electronic device. In additional embodiments, server 104 may represent a server computing system utilizing multiple computers as a server system, such as in a cloud computing environment. In additional embodiments, server 104 represents a computing system utilizing clustered computers and nodes to act as a single pool of seamless resources. In the depicted embodiment, server 104 includes authorization program 106 and database 110. In additional embodiments, server 104 may include and additional programs, storage devices, or components. Server 104 may include components, as depicted and described in further detail with respect to FIG. 3.

Authorization program 106 controls the process of protecting or limiting access to the resource file 110, and applying the triggering event which releases the decryption method or key to allow the user permission to access the resource file 110. A resource can be any document or application which can be created, modified, or viewed on a computing device. Examples of a resource include a deed, a contract, lecture notes, PowerPoint presentations, or any other document which a user decides to apply parameters to the resource in order to limit access to the resource until a specific triggering event has occurred or a time limit has expired. The parameters associates with, or related to these and additional resources can be, for example, accessible by the parties which have access to the resource or the parameters can be hidden from the parties which have access to the resource. An example of when a parameter may be visible is regarding the releasing of notes or reports from a meeting, so the participants of the meeting know when they can access the information. An example of an instance where the parameters may be hidden is when the resource which is decrypted is sensitive material such as a person's will and testament, or confidential information. The triggering event parameters are the events which access function 106 uses to determine when the resource can be made accessible to the users. The triggering events can be, for example, a predetermined time frame passing, the death of a person, the sale of a house, a financial event such as a drop or spike in stock prices, an emergency situation, the conclusion of a conference or class, or any event which can transpire which authorization program 106 is able to gather information about, or which a third party can inform authorization program 106 has occurred. Authorization program 106 informs and/or permits access to the resource to specified users when the triggering event occurs and the resource is accessible. In the depicted embodiment, authorization program 106 is located on server 104. In additional embodiments, authorization program 106 may be located on additional servers, provided authorization program 106 has access to and/or is accessible to resource file 110, encryption function 108, and recipient computing device 112. In the depicted embodiment, authorization program 106 includes encryption function 108.

Encryption function 108 encrypts the resource file 110 and controls the decryption process of the resource when requested to decrypt the resource. In one embodiment, the decryption process can be performed by encryption function 108. In additional embodiments, the decryption process occurs on the client end, and encryption function 108 supplies the client with the necessary information (e.g., decryption key or password) to decrypt the document or application. Encryption function 108 turns the resource into a protected format through an encryption process. Encryption function 108 can apply a number of different encryption techniques to the resource file 110 to protect the resource file 110 from unapproved access. In one embodiment, encryption function 108 performs symmetric encryption. Symmetric encryption scrambles the resource file 110 into an unreadable format. This unreadable format is encrypted and decrypted with a single key, which a substantial number of users who are accessing resource file 110 have access to. In symmetric encryption the decryption of resource file 110 is done in a similar method as the encryption with the use of the single key. In additional embodiments, encryption function performs asymmetric encryption which scrambles resource to an unreadable format, and uses a series of keys. In asymmetric encryption there are different types of keys, one type of key is a private key which is not shared, and a public keys which are shared. In additional embodiments, encryption function 108 uses additional methods of encryption not described to protect resource file 110 from being accessed prior to the parameters being reached or triggering event transpiring.

In the depicted embodiment, encryption function 108 is located on authorization program 106. In additional embodiments, encryption function 108 may be located on additional servers provided authorization program 106 has access to encryption function 108. In additional embodiments, encryption function 108 may be a function of additional programs, or a standalone program located on server 104 or an additional server or computing device, provided encryption function 108 is accessible to authorization program 106.

Resource file 110 may be a single file or a group of files which may be written to and/or read by authorization program 106 or encryption function 108. In one embodiment, resource file 110 includes, for example, a resources, at least one triggering event associated with the resource. Resource file 110 can be, for example, the documents or applications which are to be encrypted, or the keys associated with the decryption of the documents or applications. In additional embodiments, resource file 110 may be written to and/or read by authorization program 106 and/or additional computing devices, servers, computers, components, or additional devices not shown. In the depicted embodiment, database 110 is stored on server 104. In additional embodiments, database 110 may reside on an alternative server, computer, or computing device, provided database 110 is able to communicate with authorization program 106 and additional devices, programs, and components (not shown).

Recipient computing device 112 may be a desktop computer, laptop computer, tablet computer, netbook computer, personal computer (PC), mobile device, or any programmable electronic device capable of communicating with authorization program 106 or resource file 110 via network 102. Recipient computing device 112 receives either the encrypted resource file 110, or the decrypted resource file 110. If recipient computing device 112 receives the encrypted resource file 110 then the recipient cannot access the file until the requirements are met to decrypt resource file 110. In additional embodiments, recipient's computing device 112 may be any electronic device or computing system capable of sending and receiving data, and communicating with server 104 via network 102. In the depicted embodiment, recipient's computing device 112 communicates with server 104 via network 102.

Figure 2:
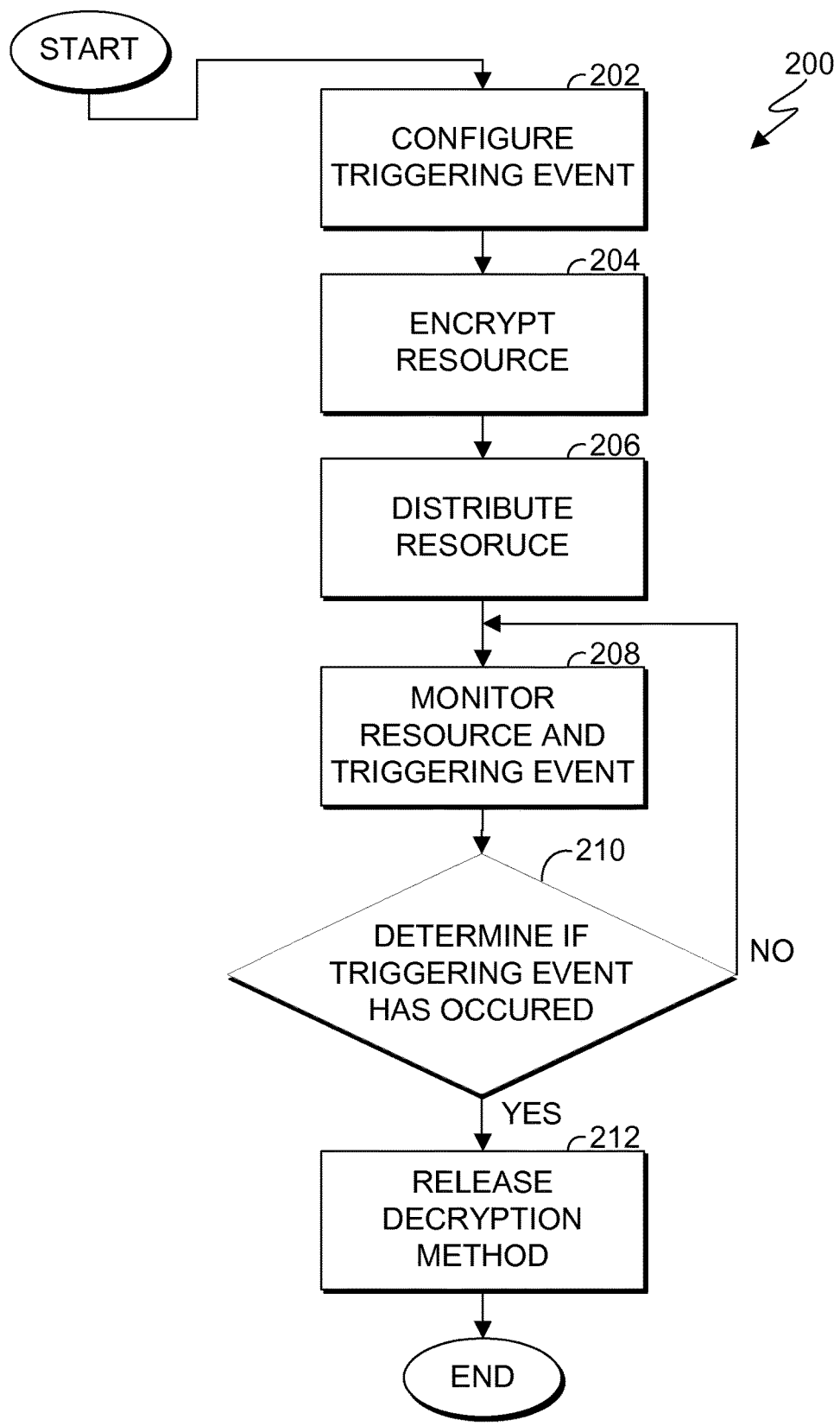
FIG. 2 illustrates a flowchart of the operational steps taken by an authorization program to protect a resource until an event transpires and then to permit access the resource, within the computing environment of FIG. 1, according to an embodiment of the present invention.

FIG. 2 illustrates a flowchart of the operational steps taken by authorization program 106 to protect a resource through encryption, within computing environment 100 on FIG. 1, in accordance with an embodiment of the present invention. Flowchart 200 depicts the steps taken by authorization program 106 to apply encryption and triggering event parameters to resource file 110 and monitor resource file 110 until the triggering event parameters have been met, then decrypt resource file 110 for the approved users. It should be appreciated FIG. 2 provides only an illustration of one implementation and does not imply any limitations with regard to the environments in which different embodiments may be implemented. Many modifications to the depicted environment may be made.

In step 202, encryption function 108 configures the triggering event. The triggering event may be, for example, a temporal event (e.g., a time period after the start of a conference call, a date/time), a financial event (e.g., a specified stock meeting a certain price), an environmental event (e.g., an earthquake, temperature spike), a personal event (e.g., the birth of a child, the marriage of a person) or another type of event. In general, the triggering event may be any type of real world event that can be monitored. Initially encryption function 108 receives a request from a user to protect resource file 110. Encryption function 108 configures the triggering event. Encryption function 108 configures the triggering event associated with resource file 110. The triggering event is specified by the user attempting to encrypt resource file 110. As used herein, a triggering event describes a triggering event, time period, or other set of one or more parameters which must be met before decryption of resource file 110 is allowed. Encryption function 108 incorporates the triggering event, time period, or other parameters which are associated with resource file 110 which need to transpire before the decryption process begins. These parameters can be hidden or public from recipients of the encrypted resource, depending on the preferences of the user or entity that caused resource file 110 to be encrypted by encryption function 108. In one embodiment, the user or another entity informs encryption function 108 of the triggering event which must transpire for the decryption to begin.

In some embodiments, configuring the triggering event results in encryption function 108 monitoring the resource and the triggering event (see step 208). For example, if the triggering event specifies that "Stock A" must reach a specified price before the decryption key for the encrypted resource may be released, then encryption function 108 may monitor the stock market, and more specifically, the sale price of "Stock A" until the specified price has been reached. In another example, the triggering event may be the marriage of a person. In such an embodiment, encryption function 108 may configure the triggering event to monitor local newspapers or other informational databases or resources that could include text information regarding the marriage of the person, such as, for example, a wedding announcement in the local newspaper. Based on the specific triggering event and the parameters associated with the triggering event to cause encryption function 108 to decrypt the encrypted resource, encryption function 108 may monitor a variety of resources, and select which resources to monitor when configuring the triggering event.

In step 204, encryption function 108 encrypts the resource. Encryption function 108 may receive encryption parameters specifying a desired type of encryption for to apply to resource file 110. Encryption function 108 applies the desired type of encryption to resource file 110, e.g., symmetrical, asymmetrical, or another form of encryption. In one embodiment, encryption function 108 performs the type of encryption specified by a user or another entity. In additional embodiments, encryption function 108 selects the type of encryption. Encryption function 108 uses the configure encryption parameters to perform the intended encryption method and/or process. The encryption parameters can be symmetrical encryption, asymmetrical encryption, or another form of encryption. Upon encrypting the resource, encryption function 108 associates the decryption information (e.g., decryption key) with the previously configured triggering event such that encryption function 108 does not release the decryption information until the triggering event parameter(s) have been met.

In step 206, encryption function 108 distributes the encrypted resource. Encryption function 108 distributes the encrypted resource to the intended destinations or recipients. In additional embodiments, encryption function 108 distributes the encrypted resource to recipient computing device 112 or another database or repository. In additional embodiments, encryption function 108 informs the recipient that the encrypted resource has be distributed to recipient computing device 112.

In step 208, encryption function 108 monitors the triggering event. The trigger event can be, for example, the passage of a set amount of time, a specific date has been reached, a user has approved the release of the decryption method/key, or another criteria has been reached. In one embodiment, encryption function 108 monitors the triggering event using keyword search using natural language processing (NLP) or semantic analysis to the content to identify a subject for the reference In additional embodiments, encryption function 108 monitors the trigger event using various natural language processing techniques on the text regarding the triggering event. In yet another embodiment, encryption function 108 performs natural language processing including semantic typing with n-gram analysis. In additional embodiments, encryption function 108 searches for the specified triggering event through keyword searches, optimization processes, or other forms of monitoring processes which scan repositories and computing devices connected to network 102 for information related to the specified triggering event. This information can be, for example, an obituary in a newspaper or other database, a stock price reaching a predetermined value, or the sending of an email to employees within a corporation. Encryption function 108 may, for example, gain access to repositories or additional computing devices connected to network 102 to determine that a specific triggering event has occurred, or that a time limit specified by the triggering event has expired. In additional embodiments, encryption function 108 monitors resource file 110 and the triggering event to determine if premature attempts are made to access resource file 110.

In decision 210, encryption function 108 determine if the triggering event has occurred. Encryption function 108 determines if the triggering event has occurred/expired based on the information obtained from monitoring the triggering event (see step 208). In one embodiment, encryption function 108 uses natural language processing as described in step 208 to determine if the triggering event has occurred. If encryption function 108 determines the triggering event has occurred (YES branch, proceed to decision 212), encryption function 108 proceeds to release the decryption method or key. If encryption function 108 determines the triggering event has not occurred (NO branch, proceed to decision 208), encryption function 108 continues to monitor for the triggering event to occur.

In step 212, encryption function 108 release the decryption method or key. Once encryption function 108 determines the required triggering event has occurred, encryption function 108 releases the decryption method or key to the preapproved recipient via network 102 to recipient's computing device 112. The recipient then has access to decrypt resource file 110 and view resource file 110. In one embodiment, encryption function 108 releases the decryption method or key for a predetermined time period before the decryption method or key expires and after the expiration of the decryption method or key, the recipient can no longer view resource file 110. In additional embodiments, the decryption method or key expires after a specified number of uses (e.g., uses of the key to access the resource). In additional embodiments, the decryption method or key does not expire. In additional embodiments, encryption function 108 decrypts resource file 110 and sends the decrypted resource to recipient's computing device 112. In additional embodiments, encryption function 108 decrypts resource file 110 and alerts the recipients as well as send the decrypted resource to recipient's computing device 112.

Figure 3:
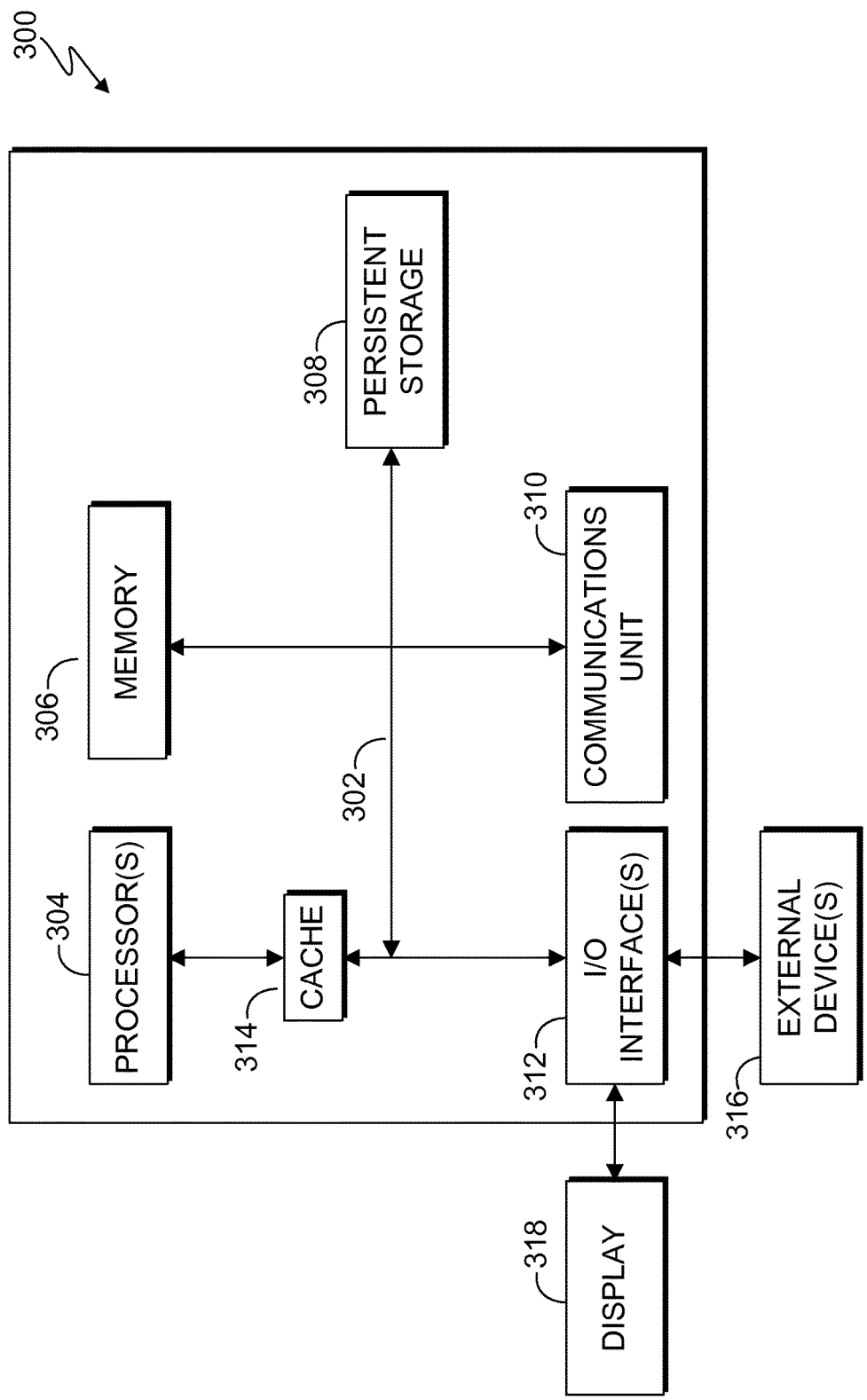
FIG. 3 illustrates a block diagram depicting the internal and external components of the server and recipient computing device of FIG. 1, according to an embodiment of the present invention.

FIG. 3 depicts a block diagram 300 of components of server 104 and recipient computing device 112, in accordance with an illustrative embodiment of the present invention. It should be appreciated FIG. 3 provides only an illustration of one implementation and does not imply any limitations with regard to the environments in which different embodiments may be implemented. Many modifications to the depicted environment may be made.

Server 104 and recipient computing device 112 includes communications fabric 302, which provides communications between computer processor(s) 304, memory 306, persistent storage 308, communications unit 310, and input/output (I/O) interface(s) 312. Communications fabric 302 may be implemented with any architecture designed for passing data and/or control information between processors (such as microprocessors, communications and network processors, etc.), system memory, peripheral devices, and any additional hardware components within a system. For example, communications fabric 302 may be implemented with one or more buses.

Memory 306 and persistent storage 308 are computer-readable storage media. In one embodiment, memory 306 includes random access memory (RAM) and cache memory 314. In general, memory 306 may include any suitable volatile or non-volatile computer-readable storage media.

Memory 306 is stored for execution by one or more of the respective computer processors 304 of server 104 and recipient computing device 112 via one or more memories of memory 306 of server 104 and recipient computing device 112. In the depicted embodiment, persistent storage 308 includes a magnetic hard disk drive. Alternatively, or in addition to a magnetic hard disk drive, persistent storage 308 may include a solid state hard drive, a semiconductor storage device, read-only memory (ROM), erasable programmable read-only memory (EPROM), flash memory, or any additional computer-readable storage media that is capable of storing program instructions or digital information.

The media used by persistent storage 308 may also be removable. For example, a removable hard drive may be used for persistent storage 308. Additional examples include optical and magnetic disks, thumb drives, and smart cards that are inserted into a drive for transfer onto another computer-readable storage medium that is also part of persistent storage 308.

Communications unit 310, in the examples, provides for communications with additional data processing systems or devices, including server 104 and recipient computing device 112. In the examples, communications unit 310 includes one or more network interface cards. Communications unit 310 may provide communications through the use of either or both physical and wireless communications links.

I/O interface(s) 312 allows for input and output of data with additional devices that may be connected to server 104 and recipient computing device 112. For example, I/O interface 312 may provide a connection to external devices 316 such as a keyboard, keypad, camera, a touch screen, and/or some additional suitable input device. External devices 316 may also include portable computer-readable storage media such as, for example, thumb drives, portable optical or magnetic disks, and memory cards. Software and data used to practice embodiments of the present invention, e.g., authorization program 106 and encryption function 108 may each be stored on such portable computer-readable storage media and may be loaded onto persistent storage 308 of server 104 and recipient computing device 112 via I/O interface(s) 312 of server 104 and recipient computing device 112. I/O interface(s) 312 also connect to a display 318.

Display 318 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or additional freely propagating electromagnetic waves, electromagnetic waves propagating through a waveguide or additional transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In additional embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

The computer readable program instructions may be provided to a processor of a general purpose computer, special purpose computer, or additional programmable data processing apparatus to produce a machine, such that the instructions, which execute via the processor of the computer or additional programmable data processing apparatus, create means for implementing the functions/acts specified in the flowchart and/or block diagram block or blocks. The computer readable program instructions may also be stored in a computer readable storage medium that may direct a computer, a programmable data processing apparatus, and/or additional devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, additional programmable data processing apparatus, or additional device to cause a series of operational steps to be performed on the computer, additional programmable apparatus or additional device to produce a computer implemented process, such that the instructions which execute on the computer, additional programmable apparatus, or additional device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or table of instructions, which comprises one or more executable instructions for implementing the specified logical function(s). In some alternative implementations, the functions noted in the block may transpire out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method for protecting a resource, the method comprising:
    receiving the resource and a parameter, wherein the parameter indicates a condition under which the resource is made accessible to an entity attempting to access the resource, and wherein the condition of the parameter is an occurrence of a real world event that is not associated with an identity of the entity attempting to access the resource;
    encrypting, by one or more processors, the resource;
    associating, by one or more processors, the parameter with decryption information for the encrypted resource, wherein the decryption information enables decryption of the encrypted resource without requiring additional information to decrypt the encrypted resource;
    sending, by one or more processors, the encrypted resource to a computing device;
    detecting, by one or more processors, an access attempt corresponding to the received encrypted resource, wherein the access attempt is made by the entity attempting to access the resource;
    determining, by one or more processors, whether the access attempt meets the condition of the parameter by monitoring external information corresponding to the occurrence of the real world event and determining, by one or more processors, that the real world event has occurred based on the external information; and
    responsive to determining that the condition of the parameter has been met, sending, by one or more processors, the associated decryption information to the computing device.

2. The method of claim 1, further comprising:
    receiving an indication of the encrypted resource which contains information regarding the parameter.

3. The method of claim 1, further comprising:
    identifying, by one or more processors, the encrypted resource which contains information regarding the parameter.

4. The method of claim 1, further comprising:
    informing, by one or more processors, a user of the computing device, that the decryption information is able to decrypt the encrypted resource.

5. The method of claim 1, further comprising:
    subsequent to sending the encrypted resource to the computing device, receiving a request to alter the parameter associated with the decryption information; and
    altering, by one or more processors, the parameter.

6. A computer program product for protecting a resource, the computer program product comprising:
    one or more computer readable storage media and program instructions stored on the one or more computer readable storage media, the program instructions comprising:
    program instructions to receive the resource and a parameter, wherein the parameter indicates a condition under which the resource is made accessible to an entity attempting to access the resource, and wherein the condition of the parameter is an occurrence of a real world event that is not associated with an identity of the entity attempting to access the resource;
program instructions to encrypt the resource;
program instructions to associate the parameter with decryption information for the encrypted resource, wherein the decryption information enables decryption of the encrypted resource without requiring additional information to decrypt the encrypted resource;
program instructions to send the encrypted resource to a computing device;
program instructions to detect an access attempt corresponding to the received encrypted resource, wherein the access attempt is made by the entity attempting to access the resource;
program instructions to determine, whether the access attempt meets the condition of the parameter by monitoring external information corresponding to the occurrence of the real world event and determining, by one or more processors, that the real world event has occurred based on the external information; and
program instructions to, responsive to determining that the condition of the parameter has been met, send, by one or more processors, the associated decryption information to the computing device.

7. The computer program product of claim 6, further comprising:
program instructions, stored on the one or more computer readable storage media, to receive an indication of the encrypted resource which contains information regarding the parameter.

8. The computer program product of claim 6, further comprising:
program instructions, stored on the one or more computer readable storage media, to identify the encrypted resource which contains information regarding the parameter.

9. The computer program product of claim 6, further comprising:
program instructions, stored on the one or more computer readable storage media, to inform a user of the computing device, that the decryption information is able to decrypt the encrypted resource.

10. The computer program product of claim 6, further comprising:
program instructions, stored on the one or more computer readable storage media, to, subsequent to sending the encrypted resource to the computing device, receive a request to alter the parameter associated with the decryption information; and
program instructions, stored on the one or more computer readable storage media, to alter the parameter.

11. A computer system for protecting a resource, the computer system comprising:
one or more computer processors, one or more computer readable storage media, and program instructions stored on the computer readable storage media for execution by at least one of the one or more processors, the program instructions comprising:
program instructions to receive the resource and a parameter, wherein the parameter indicates a condition under which the resource is made accessible to an entity attempting to access the resource, and wherein the condition of the parameter is an occurrence of a real world event that is not associated with an identity of the entity attempting to access the resource;
program instructions to encrypt the resource;
program instructions to associate the parameter with decryption information for the encrypted resource, wherein the decryption information enables decryption of the encrypted resource without requiring additional information to decrypt the encrypted resource;
program instructions to send the encrypted resource to a computing device;
program instructions to detect an access attempt corresponding to the received encrypted resource, wherein the access attempt is made by the entity attempting to access the resource;
program instructions to determine, whether the access attempt meets the condition of the parameter by monitoring external information corresponding to the occurrence of the real world event and determining, by one or more processors, that the real world event has occurred based on the external information; and
program instructions to, responsive to determining that the condition of the parameter has been met, send, by one or more processors, the associated decryption information to the computing device.

12. The computer system of claim 11, further comprising:
program instructions, stored on the computer readable storage media for execution by at least one of the one or more processors, to receive an indication of the encrypted resource which contains information regarding the parameter.

13. The computer system of claim 11, further comprising:
program instructions, stored on the computer readable storage media for execution by at least one of the one or more processors, to identify the encrypted resource which contains information regarding the parameter.

14. The computer system of claim 11, further comprising:
program instructions, stored on the computer readable storage media for execution by at least one of the one or more processors, to inform a user of the computing device, that the decryption information is able to decrypt the encrypted resource.

15. The computer system of claim 11, further comprising:
program instructions, stored on the computer readable storage media for execution by at least one of the one or more processors, to, subsequent to sending the encrypted resource to the computing device, receive a request to alter the parameter associated with the decryption information; and
program instructions, stored on the computer readable storage media for execution by at least one of the one or more processors, to alter the parameter.

* * * * *